United States Patent [19]

Connelly et al.

[11] 3,950,294

[45] Apr. 13, 1976

[54] AQUEOUS COATING COMPOSITIONS OF DISPERSIONS OF THERMOPLASTIC ADDITION POLYMERS WITH LOW MOLECULAR WEIGHT PLASTICIZERS

[76] Inventors: William Connelly, 15 Lynch Road, Willowdale, Toronto, Ontario, Canada; Hamid Iqbal Khan, c/o Paintex Limited, P.O. Box 273, Ferozepur Road, Lahore, Pakistan; Ian Hugh McEwan, 60 Ravendale Court, Kleinburg, Ontario, Canada

[22] Filed: Jan. 30, 1974

[21] Appl. No.: 438,023

Related U.S. Application Data

[63] Continuation-in-part of Ser. No. 378,492, July 12, 1973, abandoned.

[52] U.S. Cl...... 260/29.6 R; 260/17 A; 260/29.6 H; 260/29.6 TA; 260/29.6 NR; 260/29.6 RW; 260/29.6 WA; 260/29.6 SQ; 260/29.6 MP; 260/29.6 MN; 260/31.2 R; 260/836; 428/500
[51] Int. Cl.².................... C08L 25/06; C08L 41/00
[58] Field of Search .. 260/29.6 R, 29.6 H, 29.6 TA, 260/29.6 NR, 29.6 SQ

[56] References Cited

UNITED STATES PATENTS

| | | | |
|---|---|---|---|
| 2,624,718 | 1/1953 | Bezman et al. | 260/29.6 H |
| 3,208,093 | 9/1965 | Hansen | 260/29.6 H |
| 3,524,828 | 8/1970 | Keithley | 260/29.6 H |
| 3,809,667 | 5/1974 | Coaker et al. | 260/31.8 R |
| 3,840,487 | 10/1974 | Dyson et al. | 260/29.6 H |

*Primary Examiner*—Harold D. Anderson

[57] ABSTRACT

A composition which may be used in a coating formulation or a binder formulation for non-woven fabrics or in moulding formulations which comprises a solid, waterinsoluble, thermoplastic, synthetic addition polymer comprising at least one $\alpha,\beta$-ethylenically unsaturated monomer together with at least one non-reactive plasticizer selected from low molecular weight monomeric esters and low molecular weight polymeric esters, the polymer having an intrinsic viscosity within the range of from 0.20 to 1.0 dl./g., said composition being in the form of an aqueous dispersion or a stable powder.

11 Claims, No Drawings

AQUEOUS COATING COMPOSITIONS OF DISPERSIONS OF THERMOPLASTIC ADDITION POLYMERS WITH LOW MOLECULAR WEIGHT PLASTICIZERS

This application is a continuation-in-part of U.S.A. application Ser. No. 378,492 filed on July 12, 1973, now abandoned.

This invention relates to modified synthetic addition polymers of the thermoplastic type in the form of aqueous dispersions and stable powders.

There have already been proposed methods for incorporating modifiers such as plasticizers of compatible polymeric materials in the particles of polymers dispersed in non-aqueous liquids. Such modifiers are desirably incorporated when the polymer dispersions are to be used in coating compositions and the characteristics of the coating films produced therefrom require alteration, e.g. in respect of hardness, flexibility, weathering, gasoline resistance, etc. Similar methods have also been proposed in the field of aqueous polymerization.

The present invention seeks to provide a composition comprising a polymer having an intrinsic viscosity within a particular range which consequently allows the formulation of coating compositions which give films of superior gloss, outstanding durability and good flow properties. The compositions may also be used in moulding formulations and binder formulations for non-woven fabrics, e.g. glass mat binders.

Thus, the present invention provides a novel type of composition comprising a solid, water-insoluble, thermoplastic synthetic addition polymer comprising at least one $\alpha,\beta$-ethylenically unsaturated monomer together with at least one non-reactive plasticizer selected from low molecular weight monomeric esters and low molecular weight polymeric esters, said polymer having an intrinsic viscosity within the range of from 0.20 to 1.0 dl/g, said composition being in the form of an aqueous dispersion or a stable powder.

The monomer present in the addition polymer is preferably very slightly soluble in water. It has been found that the water solubility of the monomer should preferably not exceed 10 percent by weight and most preferably 3 percent by weight. At the same time it has been found that the solubility of the monomer should preferably be matched with the solubility of the plasticizer.

Where more than one monomer is present in the addition polymer, the main monomer is preferably very slightly watersoluble as described above, while the other monomers may be water soluble. For example, N-vinyl pyrrolidone might be used in amounts up to 25 percent by weight based on the weight of total solids, without affecting the properties of the polymer unduly. It would appear that when a water soluble monomer is present, the monomer partitions itself between the insoluble monomer phase and the water and preferentially in the monomer phase. Preferably the water soluble monomer has a distribution ratio greater than 0.1 and more preferably greater than 1.0 (measured at room temperature). Distribution ratio may be defined as the ratio of the weight of a component in monomer to the weight of the same component in water, where equal parts of monomer and water are used. Alternatively whether a water soluble monomer can be used can be determined by experiment, e.g. if the additional monomer were present in the final polymer and was not dissolved in the water or vice versa. The choice of such a monomer is also limited to those monomers which are compatible with the other monomers.

The monomer of the addition polymer may be selected from styrene, lower alkyl-methacrylates, -acrylates, -itaconates, -maleates and -fumarates, vinyl acetate, acrylic acid, methacrylic acid, itaconic acid, maleic acid, fumaric acid, acrylamide, lower alkyl acrylamides, N-alkoxy modified acrylamides, such as N-hydroxymethyl acrylamide and N-butoxymethyl acrylamide, diacetone acrylamide, maleamic acid, maleamide, furamide and N-monoalkyl-/-aryl-substituted amides.

Preferably, the addition polymer is a homopolymer of styrene or methyl methacrylate or a copolymer of styrene or methyl methacrylate. The copolymer may comprise predominantly styrene or predominantly methyl methacrylate, with one or more additional monomers selected from styrene, methyl methacrylate, methacrylic acid, $\alpha$-methyl-styrene, alkyl-substituted methacrylates, $\alpha$-alkyl-substituted acrylates and $\alpha$-alkyl-substituted maleates, wherein the alkyl groups contain at least four carbon atoms. Typically the monomers of the alkyl substituted monomers are represented by such monomers as 2-ethyl-hexyl-methacrylate, butyl-acrylate, n-butyl-maleate, isobutyl-maleate and monobutyl maleate.

If the polymer is a homopolymer of methyl methacrylate or a copolymer predominantly of methyl methacrylate with one or more $\alpha$-alkyl-substituted-acrylate monomers, the intrinsic viscosity of the polymer preferably lies within the range of from 0.2 to 0.6 dl./g., more preferably from 0.25 to 0.50 dl./g. If the polymer is a copolymer predominantly of methyl methacrylate with at least 5 percent by weight of styrene or an alkyl-substituted-methacrylate or an $\alpha$-alkyl-substituted maleate, the intrinsic viscosity of the polymer has a wider range than other methyl methacrylate copolymers, namely from 0.25 to 0.70 dl./g.

Homopolymers of styrene preferably have an intrinsic viscosity within the range of from 0.2 to 0.9 dl./g., more preferably from 0.25 to 0.70 dl./g.

Styrene copolymers, wherein the styrene monomer constitutes more than 50 percent by weight of the copolymer, preferably have an intrinsic viscosity lying within the range of from 0.25 to 1.0 dl./g., more preferably from 0.3 to 0.8 dl./g. Especially good adhesion is observed when the intrinsic viscosity of these polymers is greater than or equal to 0.7 dl./g.

The non-reactive plasticizer present in the composition may be selected from low molecular weight polymeric esters and low molecular weight monomeric esters. Examples of the low molecular weight polymeric esters are butyl- and benzyl-terminated diethylene glycol-adipates, -maleates and -phthalates, and benzyl-terminated diethylene glycol epoxy resin adipates. Examples of the monomeric esters are dibutoxy ethyl succinate, dibenzyl adipate, dibenzyl phthalate, dibenzyl azalate, neopentyl glycol dibenzoate, dibenzylsebacate, butyl acetate and benzyl acetate.

The above monomeric and polymeric esters are typical of those that may form part of the addition polymer. However, one may choose as a plasticizer, any monomeric or polymeric ester of low molecular weight which is very slightly soluble in water and which is compatible with the polymer. Preferably the solubility parameter of the plasticizer is matched with that of the monomer or monomers. In order to more closely match this parameter, a surface active agent is included, when the dispersion is in the form of an emulsion. The choice of this agent is critical as it directly influences the solubility of the plasticizer in water. For example, if the plasticizer which is to be incorporated in the polymer has a low water solubility, e.g. of 0.1 to $10^{-4}$ molar, a powerful surface active agent should be chosen to further solubilize the plasticizer, e.g. an alkyl phenyl sulphonate or sulphate. However, if the water solubility of the plasticizer exceeds $1.0 \times 10^{-4}$ molar, a weaker surface active agent can be employed, e.g. a sodium alkyl aryl polyoxyethylene sulphonate. Once the choice of plasticizer is made, the choice of surface active agent is relatively simple and obvious in view of the above statements.

In the case of polymers made of suspension polymerization, it has been found that the criteria of selection of surface active agent are much less stringent. The suspension agents are water soluble stabilizers selected to stabilize monomer droplets and the polymer particles formed therefrom only. They play no part in plasticizer incorporation into the polymer.

Examples of surface active agents known in the art which may be employed include the following, either alone or in combination:— sodium dodecyl diphenyl ether disulphonate, nonylphenoxypoly(ethyleneoxy 15) ethanol, sodium N-methyl-N-oleoyl-laurate, the bis(tridecyl) ester of sodium sulphosuccinic acid, sodium lauryl sulphate and sodium dodecyl benzene sulphonate.

Examples of the water soluble stabilizers include hydroxyethyl cellulose available under the Trade Marks "Natrosol" 250 HR and "Elvanol" 52–92, and polyvinyl acetate available under the Trade Mark "Gelvatol" 20–90. Also small amounts of water soluble inorganic salts may be employed, e.g. trisodium phosphate.

It is also possible to carry out the emulsion polymerization process of this invention by relying on polymerizable ionic monomers, such as those described in U.S. Pat. Nos. 2,914,499, 2,923,734, 3,024,221 and 3,033,833 granted to the Dow Chemical Company on Nov. 24, 1959, Feb. 2, 1960, Mar. 6, 1962 and May 8, 1962, respectively, as principal stabilizers for the latex particles. The various ionic monomers are described as sulpho esters of α-methylene carboxylic acid. The sulpho esters appear to be internally and securely bound in the polymerized polymer particles, such that the aqueous dispersions are very stable, even without the presence therein of water soluble surface active agents or other stabilizing substances. In this way, very little, if any, of the contaminating surface active agent is required to stabilize the polymer particles.

The water soluble, polymerizable, ionic monomers may be selected from the group consisting of sulpho esters of the formula:

$$R - CO_2 - Q - SO_3M$$

wherein R is selected from the group consisting of vinyl and α-substituted vinyl, Q is a divalent hydrocarbon radical having its valence bonds on different carbon atoms and M is a cation selected from the group consisting of the alkali metals sodium, potassium, lithium, ammonium and substituted ammonium compounds of the formula $NR'_4$, wherein R' is hydrogen, alkyl ($C_1$–$C_4$) or alkanolamine ($C_1$–$C_3$), morpholine and substituted morpholine derivatives and water soluble salts of vinyl sulphonate and allyl sulphonate may also be used.

A very small percentage of a conventional surface active agent is preferably included with the polymerizable ionic monomer. For example, not more than 0.2 percent by weight, based on the weight of total monomers, of surface active agent is required, when from 1 percent to 5 percent by weight of the ionic monomer, based on the weight of total monomers is included in the polymerization mixture. The surface active agent may be selected from the agents described earlier.

The sulpho esters represented by the above structural formula are described at length in the above-mentioned Dow U.S. patents. However, some of the useful ionic monomers include 2-sulphoethyl acrylate, 2-sulphoethyl α-ethylacrylate, 2-sulphoethyl α-butylacrylate, 2-sulphoethyl α-hexylacrylate 2-sulphoethyl α-cyclohexylacrylate, 2-sulphoethyl α-chloroacrylate, 2-sulpho-1-propyl acrylate, 2-sulpho-1-propyl methacrylate, 1-sulpho-2-propyl acrylate and methacrylate, 2-sulpho-1-butyl acrylate and methacrylate, 1-sulpho-2-butyl acrylate and methacrylate, 3-sulpho-2-butyl acrylate and methacrylate, 2-methyl-2-sulpho-1-propyl acrylate, 2-methyl-1-sulpho-2-propyl acrylate, 3-bromo-2-sulpho-1-propyl acrylate, 3-bromo-1-sulpho-2-propyl acrylate, 3-chloro-2-sulpho-1-propyl acrylate, 1-bromo-3-sulpho-2-butyl acrylate, 1-bromo-2-sulpho-3-butyl acrylate, 1-chloro-3-sulpho-2-butyl acrylate, 1-chloro-2-sulpho-3-butyl acrylate, 3-bromo-2-sulpho-1-butyl acrylate, 3-bromo-1-sulpho-2-butyl acrylate, 3-chloro-2-sulpho-1-butyl acrylate, 3-chloro-1-sulpho-2-butyl acrylate, 1-chloro-2-methyl-3-sulpho-2-propyl acrylate, 1-chloro-2-methyl-2-sulpho-3-propyl acrylate, 1-chloro-2-(chloromethyl)-3-sulpho-2-propyl acrylate, 1-chloro-2-(chloromethyl)-2-sulpho-3-propyl acrylate, 3-methoxy-2-sulpho-1-propyl acrylate, 3-methoxy-1-sulpho-2-propyl acrylate, 2-sulphocyclohexyl acrylate, 2-phenyl-2-sulphoethyl acrylate, 1-phenyl-2-sulphoethyl acrylate, 3-sulpho-1-propyl acrylate, 3-sulpho-1-butyl acrylate, 4-sulpho-1-butyl acrylate, arsulphophenyl acrylate, ar-sulphophenyl methacrylate, 2-(arsulphophenoxy)ethyl acrylate and their sulphonate salts.

The most preferred ionic monomers useful in this modified aqueous, emulsion polymerization process are the salts of 2-sulphoethyl methacrylate, vinyl sulphonate and allyl sulphonate.

The plasticizers or modifiers which may be incorporated into polymer latex particles using this modified polymerization method are preferably the monomeric plasticizers, examples of which have been previously mentioned. Preferred plasticizers are dibenzyl adipate, dibenzyl azelate, dibenzyl sebacate, and dimethyl sebacate. Other plasticizers, such as the polyester type described earlier can be incorporated using this modified method, but increasing levels of the conventional surface active agent are required, e.g. from 0.5 percent up to 1.0 percent, which higher levels result in losing some of the advantages gained by using the ionic monomer as the principal stabilizing material.

There are various methods known for making the polymer dispersions used in the coating compositions of this invention; the following four are representative of some which may be employed. For simplicity, they may be described by the followng titles:

1. "emulsified monomer feed" process,
2. "monomer feed" process,
3. "plasticizer seed" process, and 4. "bulk suspension" process.

In the "emulsified monomer feed" process, the monomers, plasticizer, a portion of the surface active agent and a portion of the water are emulsified by vigorous agitation. These are slowly charged to the reaction vessel which contains all of the other components. The addition of the emulsion may continue for as long as 6 to 8 hours depending on the solubilities of the monomer and plasticizer. Agitation of the emulsion may be continued over the time of addition if necessary.

In the "monomer feed" process, all of the water soluble components of the system and water are charged to the reaction vessel and the monomer and plasticizer are added over a period of several hours. The time of addition is of course dependent on the solubilities of the various components.

In the third method, the "plasticizer seed" process, all of the water soluble components, the plasticizer and the water are charged to the reaction vessel and the monomer is added over a period of several hours. Again the addition time depends on the solubilities of the monomers.

In the "bulk suspension" process the plasticizer, monomer and initiator solution, optionally pigmented, may be dispersed in a solution of the stabilizers and water by suitable means with agitation and polymerized by heating in bulk. Further amounts of monomer can be slowly added thereto.

When the polymerization process is carried out using the ionic monomers as stabilizers, the method of polymerization is preferably the monomer feed method.

The quantity of plasticizer which may be incorporated into the polymer is preferably within the range of from 1 percent to 30 percent, most preferably from 5 percent to 25 percent by weight, based on the weight of total solids. All four methods of addition may be employed when the quantity of plasticizer is less than 10 percent by weight, based on the weight of total solids. However, when the quantity is from more than 10 percent to 25 percent by weight, based on the weight of total solids, the "emulsified monomer feed" process is preferably used.

Where the aqueous polymer dispersion is in the form of an emulsion, the polymer particles are preferably within the range of from 0.5 to 250 $\mu$m. If the aqueous polymer dispersion is in the form of a suspension, typically the particle size of the polymer will preferably vary from 0.01 to 5.0 mm. in diameter, more preferably from 0.1 to 1.01 mm. in diameter.

If the plasticized polymer is to be used in the form of an aqueous dispersion in a coating composition, the size of the polymer particles preferably is in the range of from 0.1 to 5 $\mu$m.

When the plasticized polymer is incorporated into the compositions of the invention as a stable powder, the size of the polymer particles is selected according to the intended use of the composition. Thus, for example, if the powder is to be used as an electrostatic spray powder, the particle size may range from 10 to 40 $\mu$m. Where the powder is to be employed in a fluidized bed, the particle size of the polymer may range from 40 to 80 $\mu$m. Powders obtained by removing the water from aqueous suspensions of the polymers will, of course, comprise particles of larger dimensions. Once again the particle size is chosen according to the intended use of the composition.

The molecular weight of the final modified polymer may be controlled by the addition of conventional agent used for this purpose, e.g. chain transfer agents, such as primary octyl mercaptan or monomethyl ether of dipropylene glycol.

Conventional polymerization initiators may be employed. For example, persulphates, hydrogen peroxide, perborates, peroxides, hydroperoxides and azo compounds soluble in the monomers or in water with convenient radical forming reaction rates, and redox systems can be used. When desird, pigments may be incorporated into the coating compositions of the invention by formulating dispersions of the pigments and adding them to the polymerization system either before or after polymerization of the monomers. In addition, other conventional paint additives may be included in said compositions, for example, fillers, dyes, resins and the like.

The aqueous coating composition of this invention may be converted to dry particulate form by removing the water therefrom by known means, e.g. by evaporation carried out under reduced pressure, spray drying and fluidized bed techniques. The polymer particles may also be separated from the water by centrifuge and the solid particles allowed to dry. Pigments, when desired may be incorporated into the powders by adding dispersions of the pigments to polymer dispersions prior to removing the water. This method has been found to be quite reliable but other methods known in the art may also be used. Other conventional paint additives may also be included in these compositions e.g. fillers, dyes, resins and the like. The powders obtained do not agglomerate during storage. The particles sinter readily and flow easily at operating temperatures. The resultant coatings are tough and durable.

The compositions may be applied to substrates according to conventional methods, e.g. by dipping, rolling and the like, or they may be used in electrophoretic coating systems, electrostatic spray powder coating systems and fluidized bed coating systems depending on the form of the compositions and substrates.

In addition to the above specific utility, the coatings have been found to be very useful as decorative coatings for metal sheet and other metal objects, e.g. metal office furniture, brackets, partition siding, hangers and frames. The coatings may of course be applied by any of the previously described methods. Again they offer the very attractive safety feature of requiring no flammable solvents for application.

One particularly useful advantage of the coatings formulated from the compositions of the invention is that they exhibit the property of reflow, i.e., the coatings may be applied to substrates and baked, then sanded with fine grit paper to a flat low gloss, abraded surface and after another baking will be restored to a high gloss, smooth surface. Thus the coating compositions have particular application as commercial automotive finishes.

The compositions of this invention have also found utility as binders for fibreglass to make mats useful as styrene soluble types for subsequent use in fibreglass reinforced plastics.

The present invention is illustrated by the following Examples which encompass various embodiments thereof. All parts, ratios, percentages and proportions are by weight unless otherwise specified.

EXAMPLE 1

Latex Polymer Preparation

Polymer of styrene/methacrylic acid/dibenzyl azalate in the weight proportions of 97/3/20 percent.

The following ingredients were charged to a 2 litre reaction flask equipped with a condenser and a thermometer. The contents were heated to 85° C.

|  | Parts |
|---|---|
| Sodium alkylaryl polyether sulphonate | 5.8 |
| Water | 150.0 |
| $Na_2S_2O_8$ | 1.5 |
| $NaHCO_3$ | 1.5 |

A pre-emulsion of the following ingredients was prepared and added to the above over a period of 3 hours.

|  | parts |
|---|---|
| Styrene | 523.8 |
| Methacrylic acid | 16.2 |
| Dibenzyl azalate | 135.0 |
| Octanethiol | 0.5 |
| Water | 675.0 |
| Sodium alkylaryl polyether sulphonate | 30.0 |
| $Na_2S_2O_8$ | 1.5 |

The contents were held for one hour to complete conversion, cooled and filtered. The plasticizer used in the above latex formulation, dibenzyl azalate was prepared as follows:

|  | Parts |
|---|---|
| Azaleic acid | 752 |
| Benzyl alcohol | 880 |
| Toluene | 50 |

The above ingredients were placed in a 2-litre flask and heated under total reflux for 45 minutes. Water was stripped from reflux until 105 g. was collected, after which the rate of esterification became slow. Dibutyl tin diacetate (1 c.c.) was added. Water was stripped until the acid number fell to 2. Toluene was next removed by a combination of heat and vacuum.

Preparation of Pigment Dispersant

|  | Parts |
|---|---|
| Hydroxy ethyl acrylate | 525 |
| Ethyl acrylate | 150 |
| Acrylic acid | 37.5 |
| Azo bisisobutyronitrile | 15 |

375 parts by weight of a mixture of ethanol/methanol/isopropanol in the proportions 82/10/8 were placed in a 2-litre flask and brought to reflux. The above-listed ingredients were added over a period of 1 ½ hours. The contents of the vessel were held for 45 minutes and a solution of 21 parts of sodium hydroxide in 360 parts of water was added. The contents were subsequently cooled to room temperature under agitation.

66 Percent Solids $TiO_2$ Mill Base

The following charge was stirred for 10 minutes using a Cowles Blade and was filtered through a 10 micron filter bag.

| Charge | Parts |
|---|---|
| $TiO_2$ | 2700 |
| Water | 675 |
| Dispersant of (hydroxyethylacrylate/ethyl acrylate/acrylic acid) Na salt | 80 |
| Sand | 1000 |

Paint Preparation

1. Waterborne Formulation

| Ingredients | Parts |  |
|---|---|---|
| Latex (as above) | 385 |  |
| Dimethylethanolamine | 3 | premixed |
| Water | 3 |  |
| 66% solids $TiO_2$ mill base | 81 |  |
| Butyl "Cellosolve" (Trade Mark for hydroxy ether) | 62 | premixed |
| Water | 10 |  |

2. Powder Formulation

| Ingredients | Parts |  |
|---|---|---|
| Latex (as above) | 385 |  |
| Dimethylethanolamine | 3 | premixed |
| Water | 3 |  |
| 66% solids $TiO_2$ mill base | 81 |  |
| Water | 226 |  |

PREPARATION OF POWDER

The powder formulation was fed to the atomizer wheel of a Nichol Spray drier (50,000 rpm). An inlet air temperature of 150° C. was used and the feed rate was so adjusted that the exhaust air temperature was 62° C. The powder obtained had a moisture content of about 0.5 percent and the particle size ranged from 10–50 μm.

APPLICATION OF POWDER

The above powder was electrostatically deposited on a "Bonderite" (Trade Mark) 1000 panel using 70 kilo volts. The panels were baked at 300° F., 350° F. and 400° F. for 10 minutes.

APPLICATION OF WATERBORNE PAINT

The above waterborne formulation was applied with a conventional gun in three passes using 60 psi air pressure. The coated panels were flash dried 60 minutes at 140° F. followed by 10 minute bakes at 300° F., 350° F. and 400° F.

In the following Table I, there are listed gloss values for films baked at the three temperatures obtained from the powder and waterborne formulations as well as their intrinsic viscosities not only for paint formulations of Example 1 but also for Examples 2 to 18.

TABLE I

POWDERS AND WATERBORNE SYSTEMS FROM THERMOPLASTIC EMULSION POLYMERS

| EX. No. | POLYMER COMPOSITION WEIGHT PROPORTIONS | INTRINSIC VISCOSITY dl/g | BAKE TEMPERATURE °F. GLOSS VALUES % | | | | | | | | | |
|---|---|---|---|---|---|---|---|---|---|---|---|---|
| | | | 300 | | | | 350 | | | | 400 | |
| | | | Powder | | Waterborne | | Powder | | Waterborne | | Powder | | Waterborne | |
| | | | 60° | 20° | 60° | 20° | 60° | 20° | 60° | 20° | 60° | 20° | 60° | 20° |
| 1 | Styrene/methacrylic acid/dibenzyl azalate 97/3/20% | 0.57 | 83 | 30 | >100 | 86 | 92 | 45 | >100 | 94 | 92 | 62 | — | — |
| 2 | Methyl methacrylate/methacrylic acid/dibenzyl azalate 97/3/20% | 0.34 | 43 | 6 | 74 | 30 | 87 | 55 | 76 | 32 | 85 | 58 | 86 | 63 |
| 3 | Styrene/methacrylic acid/dibenzyl azalate 97/3/20% | 0.46 | 94 | 45 | >100 | 99 | 95 | 56 | >100 | >100 | 96 | 82 | 100 | 99 |
| 4 | Methyl methacrylate/methacrylic acid/dibenzyl azalate 97/3/20% | 0.44 | 4 | 0 | 90 | 72 | 72 | 14 | — | — | 87 | 60 | 90 | 77 |
| 5 | Methyl methacrylate/methacrylic acid/butyl acrylate/dibenzyl azalate 87/3/10/10% | 0.53 | 0 | 0 | — | — | 26 | 2 | — | — | 84 | 42 | — | — |
| 6 | Styrene/butyl acrylate/methacrylic acid/dibenzyl azalate 87/10/3/10% | 0.78 | 14 | 0 | — | — | 54 | 10 | — | — | 90 | 39 | — | — |
| 7 | Styrene/methyl methacrylate/methacrylic acid/dibenzyl azalate 10/87/3/20% | 0.42 | 74 | 22 | — | — | 86 | 52 | — | — | 86 | 54 | — | — |
| 8 | Methyl methacrylate/styrene/methacrylic acid/benzyl adipate 92/5/3/20% | 0.43 | 56 | 15 | — | — | 84 | 47 | — | — | 87 | 56 | — | — |
| 9 | Methyl methacrylate/methacrylic acid/dibenzyl adipate 83.4/13.6/3/20% | 0.44 | 30 | 3 | — | — | 42 | 10 | — | — | 75 | 16 | — | — |
| 10 | Methyl methacrylate/2-ethyl-hexyl methacrylate/methacrylic acid/dibenzyl adipate 78/19/3/10% | 0.51 | 12 | 1 | — | — | 40 | 4 | — | — | 85 | 64 | — | — |
| 11 | Methyl methacrylate/α-methyl styrene/methacrylic acid/dibenzyl adipate 92/5/3/20% | 0.54 | 0 | 0 | — | — | 0 | 0 | — | — | 24 | 2 | — | — |
| 12 | Methyl methacrylate/isobutyl-methacrylate/methacrylic acid/dibenzyl adipate 83.4/13.6/3/20% | 0.48 | 0 | 0 | — | — | 62 | 15 | — | — | 79 | 30 | — | — |
| 13 | Styrene/butyl methacrylate/methacrylic acid/dibenzyl adipate 30/70/3/1% | 1.13 | 0 | 0 | — | — | 0 | 0 | — | — | 4 | 0 | — | — |
| 14 | Methyl methacrylate/methacrylic acid/dibenzyl adipate 97/3/20% | 0.44 | 2 | 0 | — | — | 50 | 10 | — | — | 72 | 30 | — | — |
| 15 | Styrene/methacrylic acid/dibenzyl adipate 97/3/5% | 1.34 | 0 | 0 | — | — | 0 | 0 | — | — | 4 | 0 | — | — |
| 16 | Styrene/butyl methacrylate/methacrylic acid/dibenzyl adipate 46/46/3/5% | 0.94 | 50 | 11 | — | — | 91 | 70 | — | — | 91 | 69 | — | — |
| 17 | Styrene/methacrylic acid/dibenzyl adipate 97/3/20% | 0.72 | 7 | 1 | — | — | 43 | 6 | — | — | 99 | 55 | — | — |
| 18 | Methyl methacrylate/2-ethyl-hexyl methacrylate/methacrylic acid/dibenzyl adipate 78/19/3/20% | 0.42 | 80 | 33 | — | — | 86 | 60 | — | — | 87 | 68 | — | — |

EXAMPLE 19

General Method for Suspension Polymer Preparation

Composition: Styrene/methacrylic acid/dibenzyl diethylene glycol diadipate plasticizer in the weight proportions of 77.5/2.5/20.

| Charge | Ingredients | Grams |
|---|---|---|
| A | Hydroxyethyl cellulose | 2.5 |
| | Polyvinyl alcohol | 5.0 |
| | Water | 1000.0 |
| | "Nopco" (Trade Mark) NDW (antifoam agent) as required | 6 drops |
| B | Styrene | 775.0 |
| | Methacrylic acid | 25.0 |
| | Plasticizer | 200.0 |
| | Benzoyl peroxide (78%) | 22.5 |
| | Octanethiol | 0.5 cc. |

The ingredients of Charge A were stirred with low speed agitation for ½ hour. The benzoyl peroxide of Charge B was dissolved in the styrene and methacrylic acid monomers thereof and then Charge B was added to Charge A with medium speed agitation until the desired particle size had been achieved. The combined charges were stirred for a further ten minutes and 250.0 grams of water were added.

Directly afterwards, the above was transferred into a stainless steel jacketed pot equipped with a glass lid, carrying an agitator, a thermometer, a condenser and an addition funnel. The pot was also provided with a circulating thermostat attached to the jacket, whereby it could be heated or cooled. Heat was applied to the pot and the contents were agitated gently as required.

To obtain a polymer of a finer particle size e.g. 10 μm, Charge A was split into two halves. Charge B was then added slowly into part of Charge A using high speed agitation, until a uniform pre-emulsion was obtained; the balance of Charge A and 250.0 grams of water were added, consecutively. In the above Charge B, methacrylic acid was replaced with monobutyl maleate on an equivalent weight basis.

When styrene polymers were prepared, only benzoylperoxide (78 percent) was used. However, for copolymers of methylmethacrylate, a catalyst of benzoyl peroxide (78 percent) and azodiisobutyronitrile in a weight ratio of 1:1 was used.

GENERAL HEATING PROCEDURE FOR STYRENE POLYMERS

The contents of the stainless steel pot were heated to 75° C. and held for 45 minutes. The temperature was gradually increased to 85° C. Any exothermic reaction was watched and the contents cooled, if necessary. The temperature was again increased to 92° C. – 95° C., the contents were held thereat for 5 minutes and thereafter cooled.

GENERAL HEATING PROCEDURE FOR METHYL METHACRYLATE COPOLYMERS

The contents of the stainless steel pot were heated to 65° C. – 68° C. and held for 45 minutes. The temperature was slowly increased but at the same time, any exothermic reaction was closely watched. The temperature was increased to 92° C. – 95° C. the contents were held for 5 minutes and then cooled. The polymer beads obtained were transferred into an appropriate filter bag and washed thoroughly with cold water. The cleaned beads were spread into a thin layer and dried at room temperature for 24 hours. The dried beads were next transferred into a steam oven at a temperature ± 140° F., and held for 16 hours. The dried beads were crushed.

GENERAL FORMULA FOR PIGMENTED BEAD POLYMERS

A catalyst blend of benzoyl peroxide/azodiisobutyronitrile was dissolved into one-half of the monomers of Charge B (see above) with gentle agitation.

A white pigment "Titanox" RC-R2 (Trade Mark) was dispersed using a Cowles Blade into the remaining half of the monomers of Charge B using as a dispersant the sodium salt of dioctyl sulphosuccinate (0.33 percent by weight based on pigment). These two halves were thereupon combined and dispersed in Charge A (see above). After stirring, 250 grams of water was added. The mixture was thereafter transferred into the stainless steel pot and heat was applied. No dispersant was required when aluminium pigments were used. In the following Table II, there are listed results obtained using the above general procedures in the preparation of thermoplastic suspension polymers. The fusion of the powders was tested using a thermal gradient bar and the results obtained are listed for Examples 19 to 36.

THERMAL GRADIENT BAR TEST

This test is used to assess the flow of polymers. A block of steel equipped at each end with means for heating and cooling is employed. A stable temperature gradient is set up in the bar and is measured using thermocouples embedded in the block at regular intervals. A steel panel of dimensions 4 inches × 12 inches, optionally coated on one side, is laid on the bar to which it adheres closely by virtue of magnets embedded in the bar. If the panel is uncoated, powder may be laid on it and flow behavior is observed, with temperature readings being recorded whenever softening, initial flow and good flow occurs.

TABLE II

POWDER SYSTEMS FROM THERMOPLASTIC SUSPENSION POLYMERS

| EX. No. | Polymer Composition | Catalyst Weight % | Chain Transfer Agent Weight % | Intrinsic Viscosity dl/g | Pigment Weight % | Softening Point °F. | Initial Flow Point °F. | Good Flow Point °F. |
|---|---|---|---|---|---|---|---|---|
| 19 | Methyl methacrylate/methacrylic acid/polyester 77.5/2.5/20 | Benzoyl peroxide azodiisobutyronitrile (1:1) 1.76 | Octanethiol 0.4 | 0.34 | — | 260 | 275 | 310 |
| 20 | Methyl methacrylate/methacrylic acid/polyester 77.5/2.5/20 | 1.76 | 0.1 | 0.58 | — | — | — | — |
| 21 | Methyl methacrylate/monobutyl maleate polyester 75.0/5.0/20 | 1.76 | — | 1.0 | — | 290 | Starts 400 | — |
| 22 | Methyl methacrylate/monobutyl maleate/polyester 75.0/5.0/20 | 1.76 | 0.4 | 0.38 | — | 235 | 260 | 275 |
| 23 | Methyl methacrylate/monobutyl maleate/polyester 75.0/5.0/20 | 1.76 | 0.6 | — | — | 225 | 200 | 300 |
| 24 | Styrene/methacrylic acid/polyester polyester 77.5/2.5/20 | 1.76 | 0.5 | 0.18 | — | — | — | 245 |
| 25 | Styrene/methacrylic acid/polyester 82.5/2.5/15 | 1.76 | 0.1 | 0.21 | — | — | — | 245 |
| 26 | Styrene/monobutyl maleate/polyester 80/5/15 | Benzoyl peroxide/azodiisobutyronitrile (1:1) 1.76 | Octanethiol 0.1 | 0.16 | — | — | 250 | 275 |

TABLE II-continued

POWDER SYSTEMS FROM THERMOPLASTIC SUSPENSION POLYMERS

| EX. No. | Polymer Composition | Catalyst Weight % | Chain Transfer Agent Weight % | Intrinsic Viscosity dl/g | Pigment Weight % | Softening Point °F. | Initial Flow Point °F. | Good Flow Point °F. |
|---|---|---|---|---|---|---|---|---|
| 27 | Methyl methacrylate/methacrylic acid/polyester 85.0/2.0/13.0 | 1.53 | 0.4 | — | Al 14.6 | 310 | 335 | 360 |
| 28 | Methyl methacrylate/methacrylic acid/polyester 85.0/2.0/13.0 | 1.38 | 0.13 | — | Al 7.3 | 310 | 340 | 360 |
| 29 | Methyl methacrylate/polyester 87/13 | 1.76 | 0.54 | — | Al 7.3 | 295 | 310 | 360 |
| 30 | Methyl methacrylate/methacrylic acid/polyester 77.5/2.5/20 | 1.76 | 0.54 | 0.30 | — | 310 | 335 | 370 |
| 31 | Methyl methacrylate/methacrylic acid/polyester 77.5/2.5/20 | 1.76 | 0.54 | — | TiO$_2$ 30/100 | 285 | does not flow | — |
| 32 | Methyl methacrylate/dibenzyl sebacate 80/20 | 1.76 | 0.71 | 0.20 | — | 280 | 30 | 425 |
| 33 | Methyl methacrylate/methacrylic acid/polyester 77.5/2.5/20 | Benzoyl peroxide/azodiisobutyronitrile (1:1) 1.76 | Octanethiol 0.3 | 0.26 | — | — | — | — |
| 34 | Methyl methacrylate/methacrylic acid/polyester 77.5/2.5/20 | 1.76 | 0.16 | 0.46 | — | 310 | 330 | — |
| 35 | Methyl methacrylate/styrene/dibenzylazalate 75.0/8.5/16.5 | 1.76 | 0.165 | 0.16 | — | 280 | 325 | — |
| 36 | Styrene/methacrylic acid/polyester 77.5/2.5/20 | Benzoyl peroxide 1.76 | 0.014 | 0.35 | — | 170 | 210 | — |

*Polyester: Dibenzyl diethylene glycol diadipate.

EXAMPLE 37

Pigmented Suspension Polymer

Composition: Methyl methacrylate/methacrylic acid/dibenzyl azalate of weight proportions 79.0/1.0/20. Chain transfer agent - Octanethiol = 0.41 percent by weight; catalyst: Benzoyl peroxide/azodiisobutyronitrile (1:1) = 1.76 percent by weight.

| Charge | Ingredients | Grams |
|---|---|---|
| A | Hydroxyethyl cellulose | 2.5 |
| | Polyvinyl alcohol | 6.5 |
| | Water | 1000.0 |
| B | Methyl methacrylate | 790.0 |
| | Methacrylic acid | 10.0 |
| | Dibenzyl azalate | 200.0 |
| | Octanethiol | 4.1 cc. |
| | Dispersion of White Pigment ("Tioxide" RC-R2, Trade Mark) | |
| C | To 150 grams of a solution of Charge B in which there was dissolved 1.5 grams of the sodium salt of dioctyl sulphosuccinate, there was added, slowly, 300 grams of "Tioxide" RC-R2 using a Cowles agitator at high speed. The mixture was held for 5 minutes to off-scale fineness. | |
| D | To 400 grams of a solution of Charge B, there were added 11.0 grams of benzoyl peroxide (78%) and 9.0 grams azodiisobutyronitrile. Stirring was continued until complete solution was reached. | |

Charge D was added to Charge C with slow agitation, immediately thereafter, the balance of Charge B was added. This mixture was combined with 200 grams of Charge A, slowly, with medium agitation and held for 5 to 10 minutes; until a very smooth emulsion was obtained.

The balance of Charge A was next added slowly along with 250 grams of water. The resulting mixture was transferred into a heated vessel and heat was applied. The heating was continued to 80° C. for ½ hour and the contents were held at this temperature for ½ hour. The temperature was slowly increased and any exothermic reaction was watched. The temperature reached 87° C. - 88° C., and cooling was carried out at once until the temperature was lowered to 80° C. - 82° C. At this point, about 400 grams of hot water were added at about 88° C. - 90° C. The temperature, after this addition dropped to about 75° C. Heating was continued until the temperature rose to 92° C. - 94° C. The contents were held at this temperature for 15 minutes and cooling was commenced, reducing the temperature to 25° C. - 30° C.

The resulting polymer beads were filtered off in a 5 micron bag, washed thoroughly with warm water and then with cold water. The beads were dried at room temperature for at least 16 hours, and subsequently in an oven at 140° F. The beads melted at 330° F., flow started at 370° F. and was excellent at 400° F. The particle size of the beads was about 10 μm in diameter.

EXAMPLE 38

Method I — "Emulsified Monomer Feed" — General Method

An initial charge of 1.0 part of sodium persulphate, 1.0 part of sodium bicarbonate, 3.6 parts of sodium alkyl phenol polyethoxy sulphonate (28 percent solids solution) and 100.0 parts of water were added and heated to 94 ± 2° C. in a flask equipped with stirrer, reflux condenser, addition tube and means of heating or cooking. An emulsified monomer feed consisting of 329.0 parts of methyl methacrylate (0.01 percent of monomethyl ether of hydroquinone), 36.0 parts of butyl acrylate (0.01 percent of monomethyl ether of hydroquinone), 10.0 parts of methacrylic acid (0.1 percent of hydroquinone), 100.0 parts of plasticizer, 480.0 parts of water, 20.0 parts of sodium alkyl phenol polyethoxy sulphonate (28 percent solids solution) and 1.0 part of sodium persulphate was prepared by vigorous agitation of the feed. The emulsified feed was kept agitated using a stirring device and was added by means of a positive displacement pump (adjustable to ± 10 ml./hr.) at the rate of 150 ml./hr. for twenty minutes. At the end of this addition, a milky fluid with a strong blue tinge was obtained indicating that a seed stage had formed. The addition rate was then increased to 300 ml./hr. After 4 hours total addition time, the charge temperature was raised to 87° C. for ½ hour. Sufficient dilute ammonia (10 percent) was added at this temperature to neutralize 1/3 of the acid and the charge was cooled to room temperature.

A milky blue medium viscosity dispersion resulted with a bland odor and solids of 44 percent and 99.9 percent conversion. To control molecular weight, either the monomethyl ether of dipropylene glycol was added to the emulsified feed in place of 10 percent of the water or primary octyl mercaptan at 0.1 percent on solids in the emulsified feed was added to the feed.

Method II — "Monomer Feed" — General Method

Using the same total charge as used in Method I all of the water soluble components, emulsifier and water were charged to the flask and heated to 90° C. Half of the persulphate was dissolved in water to give a 3 percent solution and held back. The monomer and plasticizer were then added according to the rates used in Method I. The persulphate solution was added separately during the final 3 hours of addition only.

Method III — "Plastizicer Seed" — General Method

This process was similar to Method II except that the plasticizer was added to the aqueous charge and vigorously agitated to give a milky dispersion. The addition monomers were then added as outlined in Method II.

EXAMPLE 39

Using Method I, the "emulsified monomer feed," a polymer dispersion was prepared having the composition: methyl methacrylate/butyl acrylate/methacrylic acid/neopentylglycol butyl adipate in the weight proportions 90/10/3.1/20.8.

The surface active substance was the sodium salt of alkyl aryl polyether sulphonate (28 percent solids solution). The chain transfer agent was 10.0 percent by weight, based on water in the feed dipropylene glycol monomethyl ether. The minimum film-forming temperature of the film obtained using the resulting dispersion was 86° F.

EXAMPLE 40

The method of Example 39 was repeated with the polymer comprising the same constituents, in the same proportions. The surface active substance was the same. However, the chain transfer agent was 0.14 percent by weight, based on the weight of monomers of octanethiol.

EXAMPLE 41

Using the same method as Example 39, a polymer of composition methyl methacrylate/butyl acrylate/methacrylic acid/neopentylglycol dibenzoate in the weight proportions 90/10/3.1/20.8 was prepared. The surface active agent was identical and the chain transfer agent was 0.05 percent by weight, based on the weight of the monomers of octanethiol. The minimum film-forming temperature of the film obtained using the resulting dispersion was 140° F.

EXAMPLE 42

The method of Example 39 was used to produce a polymer comprising styrene/butyl acrylate/methacrylic acid/dibenzylphthalate/butyl acetate in the weight proportions of 90/10/3.1/20.8/10.4. The surface active agent remained unchanged and 0.42 percent by weight based on the weight of monomers, of octanethiol was the chain transfer agent.

EXAMPLE 43

One last polymer was prepared using the method of Example 39 comprising methyl methacrylate/butyl acrylate/methacrylic acid/benzylacetate in the weight proportions 90/10/3.2/21.1. The surface active agent was identical and the chain transfer agent was 0.14 percent by weight, based on the weight of monomers, of octanethiol.

EXAMPLE 44

Methyl methacrylate/butyl acrylate copolymer in ratio 90/10 and Copolymer/plasticizer in ratio 85/15.

| Prepolymer Syrup | Grams |
|---|---|
| Dibenzyl dineopentylglycol triadipate polyester plasticizer | 500 |
| Butyl acrylate | 117 |
| Methyl methacrylate | 1049 |
| Cumene hydroperoxide | 30 |

(mix)

The polyester was heated to 140° C. and then 900 g. of the monomer mix were added over a period of five hours while maintaining a gentle reflux. The remaining monomer mix was then added rapidly to cool the batch followed by the addition of 167 g. butyl acrylate and 1503 g. of methyl methacrylate over 15 minutes. The resulting product had a viscosity U.V. Gardner Holdt at 25° C.

SUSPENSION COPOLYMER

A mixture of 400 g. of water, 0.3 g. of anhydrous trisodium phosphate, 14.0 g. of 7.50 percent by weight solution of poly(vinyl alcohol) of molecular weight approximately 110,000 and 20 percent residual vinyl acetate units, 0.8 g. of hydroxyethyl cellulose and 0.1 g. of antifoam was stirred at low speed to complete solution. The antifoam was added to break up any foam.

0.5 g. of diethylene triamine and 3.5 ml. of 28 percent ammonia solution were added to the aqueous solution. Then 5.3 g. of benzoyl peroxide paste (50 percent) dissolved in 150 g. of the prepolymer syrup were added to the aqueous solution with high speed agitation (2,000 rpm) using a 2 inch Cowles Blade in a 6 inch approximate diameter 2 litre stainless steel beaker, for 90 seconds. 200 ml. of water were then added with slow speed agitation (500 rpm). The aqueous mixture was then transferred to a jacketed stirred vessel fitted with a condenser. Stirring was continued at 100 rpm with an anchor blade while the temperature of the vessel was maintained at 80° C. by means of a circulating bath. The temperature was then raised to 85° C. and held for 1½ hours. Heating was continued for a further 1 to 2 hours at 90° C. and then the vessel was cooled to 20° C.

150 g. of polymer were recovered after decantation and washing. The particle size of the polymer beads was about 5 mm. average, intrinsic viscosity [η] was 0.31 dl./g.$^{-1}$ in acetone at 25° C.

EXAMPLE 45

Methyl methacrylate/Butyl acrylate copolymer in ratio 90/10 and Copolymer/Plasticizer in ratio 85/15.

|  | GRAMS |
|---|---|
| Dibenzyl dineopentylglycol triadipate polyester plasticizer | 11.25 |
| Methyl methacrylate | 57 |
| Butyl acrylate | 6.75 |
| Prepolymer syrup of Example 44 | 200 |

A monomer syrup of the above ingredients was prepared by blending which had a viscosity of B Gardner Holdt at 25° C. An aqueous phase of 300 g. of water, 0.3 g. of anhydrous trisodium phosphate, 0.8 g. of hydroxyethyl cellulose, 15 g. of 7.50 percent by weight solution of poly(vinyl alcohol) of molecular weight approximately 110,000 and 20 percent residual vinyl acetate units and 0.2 g. of antifoam was stirred until a clear solution was obtained. Then 8.3 g. of benzoyl peroxide paste (50 percent) were dissolved in 250 g. of the monomer syrup and this solution was added to the aqueous phase as in Example 44 and stirred at 2,000 rpm for 2 minutes. A further 400 g. of water were added at 500 rpm.

The suspension was then heated as described in Example 44. Yield: 245 g. polymer, particle size 1 μm - 1.0 mm. Polymer solids was 98.5 percent. Intrinsic viscosity [η] was 0.31 dl.g.$^{-1}$ at 25° C. in dimethyl formamide. Some vesicles in the polymer particles were believed to be filled with water. A slight polymer adherence to the stirrer and vessel was noted.

EXAMPLE 46

Example 45 was repeated omitting anhydrous trisodium phosphate. The yield was 250 g. and no polymer buildup was observed. Particle size: 10 - 250 μm with very few vesicles. Intrinsic viscosity [η] was 0.31 dl.g.$^{-1}$ at 25° C. in dimethyl formamide.

EXAMPLE 47

|  | Grams |
|---|---|
| Dibenzyl dineopentylglycol triadipate polyester plasticizer | 37.5 |
| Methyl methacrylate | 190 |
| Butyl acrylate | 22.5 |
| Benzoyl peroxide | 4 |
| Hydroxyethyl cellulose | 0.8 |
| 7.50% by weight solution of poly(vinyl alcohol) of molecular weight approximately 110,000 and 20% residual vinyl acetate units | 16 |
| Water | 400 |

The above ingredients were combined in the manner described in Example 45 with the initial stirring speed of 1,000 to 15,000 rpm being employed. The yield was 250 g. of polymer with a particle size of 5 to 150 μm, no vesicles. Intrinsic vescosity [η] was 0.74 dl.g.$^{-1}$ at 25° C. in dimethyl formamide.

EXAMPLE 48

Styrene/Butyl acrylate copolymer in ratio 90/10 and Copolymer/Plasticizer in ratio 85/15

|  | Grams |
|---|---|
| Dibenzyl dineopentylglycol triadipate polyester plasticizer | 37.5 |
| Styrene | 190 |
| Butyl acrylate | 22.5 |
| Benzoyl peroxide | 4.0 |
| Hydroxyethyl cellulose | 0.8 |
| 7.50% by weight solution of poly(vinyl alcohol) of molecular weight approximately 110,000 and 20% residual vinyl acetate units | 16 |
| Water | 400 |

The above ingredients were combined in the manner described in Example 45 with the initial stirring speed set at 500 to 600 rpm and a total heating time of 3½ hours.

An analysis was made of the final product which revealed that it consisted of three types of particles:

a. 84 percent of beads with average particle size 0.1 mm.

b. 9 percent of particles of size range 5 to 20 μm c. 1 percent of solids as a latex, particle size less than 1.0 μm.

The (a) particles were separated by decantation and intrinsic viscosity [η] was 0.81 d.l.g.$^{-1}$ in ethylene dichloride/ethanol in ratio 95/5.

The (b) particles were separated by centrifugation for 40 minutes at 5000 g. (Sorval SS-3 Centrifuge).

The (c) particles remained as a latex. Mechanical losses amounted to about 3 percent.

In order to reduce the proportion of latex particles in the above formulation, it was found advantageous to keep the initial stirring speed below 600 rpm. With compositions exluding styrene such speed control was not a critical factor.

EXAMPLE 49

Vinyl acetate/Dibenzyl dineopentylglycol triadipic acid polyester plasticizer in ratio 90/10.

To 400 g. of water were added 0.8 g. of hydroxyethyl cellulose, 10.0 g. of 7.50 percent by weight solution of poly(vinyl alcohol) of molecular weight approximately 110,000 and 20 percent residual vinyl acetate units and 0.1 g. of antifoam. The whole was stirred for 15 minutes to solution.

A mixture of 220 g. of vinyl acetate (0.1 percent hydroquinone) 30 g. of dibenzyl dineopentylglycol triadipic acid polyester plasticizer and 4.0 g. of benzoyl peroxide was added to the above solution using a Cowles mixer at 2,500 rpm for 60 seconds. Then 400 g. of water were added at 1,000 rpm.

The whole was transferred to a heated, jacketed vessel and heated with gentle agitation until reflux began. The temperature was controlled to give a slight reflux action. The reflux temperature remained at 67° C. for 3 hours and then was allowed to climb to 85° C. The batch was then held at this temperature for 1 hour and cooled to 60° F. By settling and decantation, 180 g. of beads were recovered. The beads were washed with water to give a clear supernatant. It was observed that drying the beads at a low temperature, about 40° F. helped to avoid coalescing of the beads.

The diameters of the beads ranged from 10 to 250 μm, the intrinsic viscosity in dimethyl formamide at 25° C. was 0.3 dl.g.$^{-1}$. A further 20 g. of beads were recovered from the original supernatant fluid after overnight standing with a particle size of 10 to 30 μm in diameter.

The remaining supernatant had a solids of 0.7 percent and the particle size appeared to be 1 to 5 μm. In addition to mechanical losses, a small amount of solid material was found adhering to the stirrer and vessel.

The following Examples 50 to 55 illustrate the present invention wherein a polymerizable ionic monomer is used as principal stabilizer for the latex.

EXAMPLE 50

| Charge | Ingredients | Parts |
|---|---|---|
| A | Ammonium persulphate | 1.0 |
| | Sodium bicarbonate | 1.0 |
| | "Benax" 2A1 | 0.1 |
| | Water | 700.0 |
| B | Methyl methacrylate | 360 |
| | Butyl acrylate | 40 |
| | Dibenzyl adipate | 60 |
| | Methacrylic acid | 15 |
| C | Sulphoethyl methacrylate | 5 |
| | Water | 50 |

A copolymer of methyl methacrylate/butylacrylate/methacrylic acid/dibenzyl adipate (plasticizer) in the proportions 75.8/8.4/3.2/12.6, respectively was prepared by mixing the above charges as follows: Charge A was placed in a reaction vessel and heated to 85°–90° C. Solutions of Charges B and C were prepared and added separately to the vessel containing Charge A over 2 hours. The mixture was held for 30 minutes and 10 mls of a 2½ percent aqueous solution of ammonium persulphate was added. The mixture was held for a further 30 minutes and then cooled to 30° C. A stable blue white latex of 40 percent solids was obtained, with no plasticizer separation on storage.

EXAMPLE 51

Example 50 was repeated replacing sodium bicarbonate with 1.0 g dimethylethanolamine. A latex was formed successfully, although its stability was somewhat inferior to the stability of the latex of Example 50. The reaction was also slow to convert.

EXAMPLE 52

| Charge | Ingredient | Parts |
|---|---|---|
| A | Ammonium persulphate | 1.0 |
| | Sodium bicarbonate | 0.25 |
| | "Dowfax" 2A1 | 0.1 |
| | Water | 500 |
| B | Methyl methacrylate | 334 |
| | Butyl acrylate | 37 |
| | Methacrylic acid | 15 |
| | Dibenzyl adipate | 65 |
| | Dimethylethanolamine | 3 |
| | 1-Octanethiol | 4 |
| C | Sodium allyl sulphonate | 5 |
| | Water | 50 |

Charge A was placed in a reaction vessel and heated to 90° C. Charges B and C were added separately to the vessel over a period of 2–3 hours. The mixture was held for 30 minutes and then cooled. The result was a white latex with some lids (5 g) and having solids content of 44 percent. No separation of plasticizer was observed. The RV was approximately 0.2 dl/g.

EXAMPLE 53

Clear films were prepared from the following compositions:

| | | Parts |
|---|---|---|
| 1. | Latex of Example 50 | 200 |
| | Butyl Cellosolve | 45 |
| 2. | Latex of Example 50 | 200 |
| | Dimethylethanolamine | 1 |
| | Butyl Cellosolve | 45 |
| 3. | Latex of Example 51 | 200 |
| | Butyl Cellosolve | 45 |

The above compositions were applied to "Bonderite" 1000 (Trademark) panels and steel panels primed with conventional automotive primers. The panels were prepared by baking 10 inches at 140° F followed by 10 inches at 300° F and subjected to QCT* for 16+ hours at 140° F.

| Composition | Result |
|---|---|
| 1 | No loss of gloss; slight clouding, recovery in 2 hours. |
| 2 | No loss of gloss; slight-moderate clouding, recovery in 2 hours. |
| 3 | Lost gloss, moderate clouding, patchiness after recovery. |

A composition stabilized with 1½ percent "Triton" X-200 (solids basis) would suffer extensive loss of gloss, and severe whitening without change on room temperature recovery after only 4 hours QCT.

* QCT or Humidity Testing of Latex Finish

The prepared panels were palced face down on a Cleveland Condensing Humidity Test chamber, manufactured by the "Q" Panel Company maintained at 140° F for 16+ hours.

EXAMPLE 54

| Charge | Ingredients | Parts |
|---|---|---|
| A | Ammonium persulphate | 1 |
| | Sodium bicarbonate | 0.25 |
| | "Dowfax" 2A1 | 0.1 |
| | Water | 500 |
| B | Methyl methacrylate | 334 |
| | Butyl acrylate | 37 |
| | Methacrylic acid | 15 |
| | Dibenzyl adipate | 65 |
| | Dimethylethanolamine | 3 |
| | 1-Octanethiol | 4 |
| C | Sodium allyl sulphonate | 5 |
| | Water | 50 |

Method

Charge "A" was placed in a flask and heated to 90° C. Separate emulsions of Charges "B" and "C" were prepared and added separately but concurrently to the flask over a period of 2 to 3 hours. The reaction mixture was held for 30 minutes after the additions were complete and then cooled. The yield was a white latex with some bits (5 g) and a solids content of 44 percent. No separation of the plasticizer was observed. The relative viscosity of the polymer latex was 0.2 dl/g.

EXAMPLE 55

| Charge | Ingredients | Parts |
|---|---|---|
| A | Sodium bicarbonate | 1 |
| | Ammonium persulphate | 3 |
| | Water | 2000 |
| | "Dowfax" A1 | 0.4 |
| B | Methyl methacrylate | 1336 |
| | Butyl acrylate | 148 |
| | Methacrylic acid | 54 |
| | Dibenzyl adipate | 260 |

EXAMPLE 55-continued

| Charge | Ingredients | Parts |
|---|---|---|
| | Dimethylethanolamine | 12 |
| | 1-Octanethiol | 16 |
| C | Sulphoethyl methacrylate | 10 |
| | Water | 130 |

Charge "A" was placed in a flask equipped with a stirrer and a reflux condenser. The flask was heated to 85° C and Charges "B" and "C" were added over a period of 4 hours. After their addition was completed, 1.0 g $(NH_4)_2S_4O_8$ dissolved in 5 cc of water was added.

Preparation of Powder

| Ingredients | Parts |
|---|---|
| Latex prepared as above | 1000 |
| Dimethylethanolamine | 5 |
| 66% $TiO_2$ millbase | 275 |
| Water | 695 |

This aqueous paint was dried using a Nichols Laboratory model spray dryer at the following operation conditions.

| | |
|---|---|
| Inlet air temperature | 155°C |
| Outlet air temperature | 57°C |
| Feed rate | 120 cc/min. |
| Atomizer | 90 psi |
| Feed solids | 25% |

The powder obtained was free flowing and free from agglomerates. It had a moisture (volatile) content of 0.75 percent. On baking at 300° F for 15 minutes, the powder showed complete fusion.

In the following Example 56, there is illustrated the use of the latex polymers of this invention as soluble glass mat binders.

EXAMPLE 56

Powders of the following polymer compositions were prepared by suspension polymerization but could have been made readily by spray drying latex and, in principle, by precipitation.

| | Polymer Composition parts | Glass Transition Temperature (by calculation) Tg °C | Reduced Viscosity at 0.5% w/v in ethylene dichlorine/ ethanol - 95/5 RV dl/g |
|---|---|---|---|
| (a) | Methyl methacrylate/methacrylic acid/polyester 77.5/2.5/20 | 60 | 0.50 |
| (b) | Methyl methacrylate/monobutyl maleate/polyester 75/5/20 | 60 | 0.25 |
| (c) | Styrene/methacrylic acid/ polyester 82.5/2.5/15 | 75 | 0.20 |
| (d) | Styrene/monobutyl maleate/ polyester 80/5/15 | 70 | 0.15 |

Polyester: Diethylene glycol/adipic acid/benzyl alcohol — 1/2/2 The above powders were evaluated as soluble type binders applied to chopped strand fibreglass mat as follows:

A laboratory mat making machine comprising a wooden box open at top and bottom of dimensions 15 inches × 15 inches × 13 inches deep fitted atop a galvanized metal duct housing a squirrel cage type centrifugal blower was used to prepare the bonded mats. The blower fan was so designed that air could be drawn down through the mat. The bottom of the box was so constructed with a ledge that a mat support comprising a metal screen could be installed prior to the mat making process. This procedure is a rough simulation of a commercial mat making technique.

A 14 inches × 14 inches × ⅛ inch perforated sheet of teflon was placed on the ledge of the mat making machine. A layer (15 grams) of 2 inch chopped glass fibers was sprinkled by hand on the teflon sheet with the blower on over about 10 seconds. The blower was then turned off and the glass layer was sprayed with approximately one ounce of water as a fine mist. One gram of powdered resin was then sprinkled evenly over the glass layer from a salt shaker. For the present evaluation, a mesh size of 100 percent thru 60 mesh and 100 percent retained on an 80 mesh seive using U.S. standard sieves made by the W. S. Tyler Company was used. This process was repeated 3 more times, however the blower remained turned off during the final three additions. The final mat contained 60 grams of glass and 4 grams of resin. After the mat was formed the blower was used for approximately 5 seconds to compress the mat. Another teflon sheet was then placed on the surface of the mat and the whole composite was removed from the mat machine. The composite was placed in a 200° C oven for 20 minutes with an aluminium plate 10 inches × 10 inches × ¼ inch placed on the teflon plate for compaction during the oven cycle. The composite was removed from the oven and the mat was cooled while retained between the teflon sheets after the bake cycle and then cut for testing.

The monomer solubility rate was determined by suspending a 4 inch × 5 inch section of mat in a styrene bath at 25° C. A 100 gram clip was attached to the mat, and the length of time the mat supported the weight while suspended in the bath was measured as an indication of the resin solubility rate in styrene.

The glass mats were also tested for tensile strength and retention of tensile strength after being folded. A 3 inch × 5 inch section of mat was mounted in the jaws of a tensile testing machine (Tinius Olsen) with 1 inch of the sample clamped in each jaw of the tester, leaving a 3 inch × 3 inch area of the mat visible. The force necessary to tear the mat apart was recorded. Because of the difficulty in measuring mat thickness, the tensile strength was arbitrarily expressed in pounds per inch.

The fold tensile strength was determined in a similar manner after a 3 inch × 5 inch sample has been folded 180° both forward and backward at the center line of the mat. The piece was then returned to its normal position and the tensile strength measured. The fold tensile retention is the ratio of fold tensile strength to the initial tensile strength expressed in percent and is a convenient indication of binder resin brittleness and mat handleability during subsequent mat operations.

Three 14 inch × 14 inch mats were prepared using each resin to be evaluated as the binder resin. Two test pieces were cut from random sections of each mat for each of the three evaluations. Therefore, results reported for solubility rate, tensile strength and fold tensile strength are average values determined from six evaluations.

| Polymer Composition | Tack Point °C | Liquid Point °C | Styrene Solubility Rate seconds | Tensile Strength lbs/in. | Mat Fold Tensile Strength lbs/in. | Tensile Retention % |
|---|---|---|---|---|---|---|
| (a) | 118 | over 170 | 73 | 0.35 | 0.23 | 65.8 |
| (b) | 80 | 140 | 89 | 19.20 | 10.97 | 86.8 |
| (c) | 96 | 131 | 45 | 12.03 | 5.33 | 44.4 |
| (d) | 76 | 110 | 42 | 18.53 | 6.94 | 37.5 |

All polymer compositions, except for (a) were found to provide adequate binding to chopped strand fibreglass to make mats useful as styrene soluble types for subsequent use in fibreglass reinforced plastics.

What we claim is:

1. A composition consisting essentially of an aqueous dispersion of a solid, water insoluble, thermoplastic, synthetic addition polymer consisting essentially of polymerized units from at least one α,β-ethylenically unsaturated monomer selected from the group consisting of styrene, methyl methacrylate, methacrylic acid, α-methyl styrene, esters of acrylic, methacrylic and maleic acids in which the alcohol residues are either straight or branched chain alkyl groups containing at least 4 carbon atoms, vinyl sulphonate, allyl sulphonate and sulpho esters of the formula:

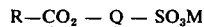

wherein R is selected from the group consisting of vinyl and α-chloro-or α-alkyl-substituted vinyl, Q is a divalent hydrocarbon radical having its valence bonds on different carbon atoms and M is a cation selected from the group consisting of sodium, potassium, lithium, morpholinium, lower alkyl substituted morpholinium, ammonium and substituted ammonium compounds of the formula NR$^1_4$, wherein R$^1$ is hydrogen, lower alkyl or alkanolamino, said monomer or monomers having been polymerized in the presence of at least one nonreactive plasticizer selected from the group consisting of dibenzyl azelate, dibenzyladipate, dibenzyl sebecate, neopentyl glycol dibenzoate, dibenzyl phthalate, butyl acetate, benzyl acetate, dibenzyl dineopentyl glycol triadipate, dibenzyl diethylene glycol diadipate and neopentyl glycol butyl adipate, said polymer having an intrinsic viscosity within the range of from about 0.20 to about 1.0 dl./g. measured at a concentration of 0.5 g. polymer per 100 ml. dimethyl formamide at 25° C.

2. A composition as claimed in claim 1 wherein the polymer is a homopolymer selected from the group consisting of styrene and methyl methacrylate homopolymers.

3. A composition as claimed in claim 1 wherein the polymer is a copolymer selected from the group consisting of copolymers predominantly of styrene and copolymers predominantly of methyl methacrylate with at least one additional monomer selected from the group consisting of styrene, methyl methacrylate, methacrylic acid, α-methyl-styrene, and esters of acrylic, methacrylic and maleic acids in which the alcohol residues are either straight or branched chain alkyl groups containing at least 4 carbon atoms.

4. A composition as claimed in claim 3 wherein the additional monomer is selected from the group consisting of styrene, methacrylic acid, α-methyl styrene, 2-ethyl-hexyl-methacrylate, butyl acrylate, n-butyl maleate, isobutyl maleate, monobutyl maleate, 2-sulphoethyl methacrylate, vinyl sulphonate and allyl sulphonate.

5. A composition as claimed in claim 1 wherein the polymer is a homopolymer of methyl methacrylate or a copolymer predominantly of methyl methacrylate with one or more esters of acrylic acid in which the alcohol residue is either a straight or branched chain alkyl group containing at least 4 carbon atoms and its intrinsic viscosity lies within the range of from about 0.20 to about 0.60 dl/g. measured at a concentration of 0.5 g. polymer per 100 ml. dimethyl formamide at 25° C.

6. A composition as claimed in claim 5 wherein the intrinsic viscosity lies within the range of from about 0.25 to about 0.50 dl/g. measured at a concentration of 0.5 g. polymer per 100 ml. dimethyl formamide at 25° C.

7. A composition as claimed in claim 1 wherein the polymer is a copolymer predominantly of methyl methacrylate and at least 5 percent by weight of one other monomer selected from the group consisting of styrene, and esters of methacrylic and maleic acids wherein the alcohol residue is either a straight or branched chain alkyl group containing at least 4 carbon atoms and its intrinsic viscosity lies within the range of from about 0.25 to about 0.7 dl/g. measured at a concentration of 0.5 g. polymer per 100 ml. dimethyl formamide at 25° C.

8. A composition as claimed in claim 1 wherein the polymer is a homopolymer of styrene and the intrinsic viscosity lies within the range of from about 0.20 to about 0.9 dl/g. measured at a concentration of 0.5 g. polymer per 100 ml. dimethyl formamide at 25° C.

9. A composition as claimed in claim 8 wherein the intrinsic viscosity lies within the range of from about 0.25 to about 0.70 dl/g. measured at a concentration of 0.5 g. polymer per 100 ml. dimethyl formamide at 25° C.

10. A composition as claimed in claim 1 wherein the polymer is a copolymer of more than 50 percent by weight of styrene and its intrinsic viscosity lies within the range of from about 0.25 to about 1.0 dl/g. measured at a concentration of 0.5 g. polymer per 100 ml. dimethyl formamide at 25° C.

11. A composition as claimed in claim 1 wherein the polymer is a copolymer of more than 50 percent by weight of styrene and its intrinsic viscosity lies within the range of from about 0.3 to about 0.8 dl/g. measured at a concentration of 0.5 g polymer per 100 ml. dimethylformamide at 25° C.

* * * * *